(12) United States Patent
Miyano et al.

(10) Patent No.: US 10,989,985 B2
(45) Date of Patent: Apr. 27, 2021

(54) WAVELENGTH CONVERTER

(71) Applicant: Panasonic Intellectual Property Management Co., Ltd., Osaka (JP)

(72) Inventors: Kentaro Miyano, Osaka (JP); Naoya Ryoki, Osaka (JP); Akihiko Ishibashi, Osaka (JP); Masaki Nobuoka, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/831,532

(22) Filed: Mar. 26, 2020

(65) Prior Publication Data

US 2020/0387047 A1    Dec. 10, 2020

(30) Foreign Application Priority Data

Jun. 7, 2019 (JP) .............................. JP2019-106934

(51) Int. Cl.
*G02F 1/355* (2006.01)
*G02F 1/35* (2006.01)
*G02F 1/37* (2006.01)

(52) U.S. Cl.
CPC .......... *G02F 1/3551* (2013.01); *G02F 1/3544* (2013.01); *G02F 1/3558* (2013.01); *G02F 1/37* (2013.01); *G02F 1/3548* (2021.01)

(58) Field of Classification Search
CPC .... G02F 1/3544; G02F 1/3548; G02F 1/3551; G02F 1/3558; G02F 1/37; G02F 2001/3548
See application file for complete search history.

(56) References Cited

U.S. PATENT DOCUMENTS 7,848,011 B2 * 12/2010 Furuya ............... G02F 1/37
                                                     359/328
7,976,717 B2 *  7/2011 Li ..................... G02F 1/3558
                                                     216/87

(Continued)

FOREIGN PATENT DOCUMENTS

JP    6-132595    5/1994
JP    6-138506    5/1994

(Continued)

*Primary Examiner* — Daniel Petkovsek
(74) *Attorney, Agent, or Firm* — Wenderoth, Lind & Ponack, L.L.P.

(57) ABSTRACT

Provided herein is a wavelength converter capable of producing shorter wavelengths by wavelength conversion than in related art. A wavelength converter of the present disclosure includes: a first layer formed of a single crystal represented by general formula $RAMO_4$; and a second layer formed of a single crystal represented by the general formula $RAMO_4$ and having a direction of polarization reversed 180° from a direction of polarization of the first layer, wherein, in the general formula, R represents one or more trivalent elements selected from the group consisting of Sc, In, Y, and a lanthanoid element, A represents one or more trivalent elements selected from the group consisting of Fe(III), Ga, and Al, and M represents one or more divalent elements selected from the group consisting of Mg, Mn, Fe(II), Co, Cu, Zn, and Cd.

13 Claims, 4 Drawing Sheets

(56) References Cited

U.S. PATENT DOCUMENTS

| | | | | |
|---|---|---|---|---|
| 8,223,427 | B2* | 7/2012 | Liu | G02F 1/3558 |
| | | | | 359/328 |
| 8,264,766 | B2* | 9/2012 | Muramatsu | G02F 1/3775 |
| | | | | 359/328 |
| 9,405,168 | B2* | 8/2016 | Ota | C30B 33/02 |
| 9,899,213 | B2* | 2/2018 | Ueta | C30B 29/406 |
| 2003/0231890 | A1 | 12/2003 | Asobe et al. | |
| 2020/0388981 | A1* | 12/2020 | Ryoki | H01S 3/09415 |

FOREIGN PATENT DOCUMENTS

| | | | | |
|---|---|---|---|---|
| JP | 9-127564 | | 5/1997 | |
| JP | 2004-020870 | | 1/2004 | |
| JP | 2004-239959 | | 8/2004 | |
| JP | 2006-295215 | | 10/2006 | |
| JP | 2010-078639 | | 4/2010 | |
| JP | 4603020 | B | 12/2010 | |
| JP | 4967626 | B | 7/2012 | |
| JP | 2012159862 | A * | 8/2012 | G02F 1/377 |

\* cited by examiner

500 HIGH-FREQUENCY HEATING FURNACE

600 HIGH-FREQUENCY HEATING FURNACE

WAVELENGTH CONVERTER

TECHNICAL FIELD

The present disclosure relates to a wavelength converter using a $RAMO_4$ monocrystal.

BACKGROUND

A technique for wavelength conversion using the nonlinear optical effect is known as a way of widening a wavelength range such as in lasers. Quasi-phase-matching is one such technique. Quasi-phase-matching is a technique that periodically reverses a direction of dielectric polarization of a nonlinear optical crystal by 180° to match phases in a quasi fashion.

SUMMARY

Japanese Patent Numbers 4603020 and 4967626 describe wavelength converters using quasi-phase-matching.

The $LiTaO_3$ crystals and $LiNbO_3$ crystals described in these related art documents, for example, have a polarization reversal cycle on the order of micrometers for conversion of wavelength from 1,064 nm to 532 nm. Conversion into shorter wavelengths requires taking thinner slices of crystals. However, this is problematic because thin slicing of crystals is not an easy process.

The present disclosure is intended to provide a solution to the foregoing problem of the related art, and it is an object of the present disclosure to provide a wavelength converter capable of producing short wavelengths by wavelength conversion.

The present disclosure provides the following wavelength converters.

[1] A wavelength converter including:
a first layer formed of a single crystal represented by general formula $RAMO_4$; and
a second layer formed of a single crystal represented by the general formula $RAMO_4$ and having a direction of polarization reversed 180° from a direction of polarization of the first layer,
wherein, in the general formula, R represents one or more trivalent elements selected from the group consisting of Sc, In, Y, and a lanthanoid element, A represents one or more trivalent elements selected from the group consisting of Fe(III), Ga, and Al, and M represents one or more divalent elements selected from the group consisting of Mg, Mn, Fe(II), Co, Cu, Zn, and Cd.

[2] The wavelength converter according to [1], wherein the first layer and the second layer have an interface formed of an oxide containing A and M.

[3] The wavelength converter according to [2], wherein, in the general formula, R is Sc, A is Al, M is Mg, and the interface is an oxide of Al and Mg.

[4] The wavelength converter according to anyone of [1] to [3], including a wavelength conversion unit having a periodic polarization-reversed structure in which the first layer and the second layer are laminated in turn in a repeated fashion.

[5] The wavelength converter according to [4], wherein the wavelength conversion unit generates a second harmonic.

[6] The wavelength converter according to [5], wherein a combined thickness of one of the first layers and one of the second layers is 3.5 to 4.4 µm, and the second harmonic has a wavelength of 245 to 280 nm.

[7] The wavelength converter according to [5], wherein a combined thickness of one of the first layers and one of the second layers is 4.4 to 5.5 µm, and the second harmonic has a wavelength of 280 to 315 nm.

[8] The wavelength converter according to [5], wherein a combined thickness of one of the first layers and one of the second layers is 5.5 to 9.8 µm, and the second harmonic has a wavelength of 315 to 400 nm.

[9] The wavelength converter according to [5], wherein a combined thickness of one of the first layers and one of the second layers is 9.8 to 12.4 µm, and the second harmonic has a wavelength of 400 to 435 nm.

[10] The wavelength converter according to [5], wherein a combined thickness of one of the first layers and one of the second layers is 12.4 to 17.1 µm, and the second harmonic has a wavelength of 435 to 480 nm.

[11] The wavelength converter according to [5], wherein a combined thickness of one of the first layers and one of the second layers is 17.1 to 18.1 µm, and the second harmonic has a wavelength of 480 to 490 nm.

[12] The wavelength converter according to [5], wherein a combined thickness of one of the first layers and one of the second layers is 18.1 to 19.2 µm, and the second harmonic has a wavelength of 490 to 500 nm.

[13] The wavelength converter according to [5], wherein a combined thickness of one of the first layers and one of the second layers is 19.2 to 26.7 µm, and the second harmonic has a wavelength of 500 to 560 nm.

The present disclosure can provide a wavelength converter capable of producing short wavelengths by wavelength conversion.

DESCRIPTION OF EMBODIMENTS

Embodiments of the present disclosure are described below, with reference to the accompanying drawings.

First Embodiment

A wavelength converter of the present embodiment includes at least:
a first layer formed of a single crystal represented by general formula $RAMO_4$; and a second layer formed of a single crystal represented by the general formula $RAMO_4$ and having a direction of polarization reversed 180° from a direction of polarization of the first layer, wherein, in the general formula, R represents one or more trivalent elements selected from the group consisting of Sc, In, Y, and a lanthanoid element, A represents one or more trivalent elements selected from the group consisting of Fe(III), Ga, and Al, and M represents one or more divalent elements selected from the group consisting of Mg, Mn, Fe(II), Co, Cu, Zn, and Cd.

Figure 1:
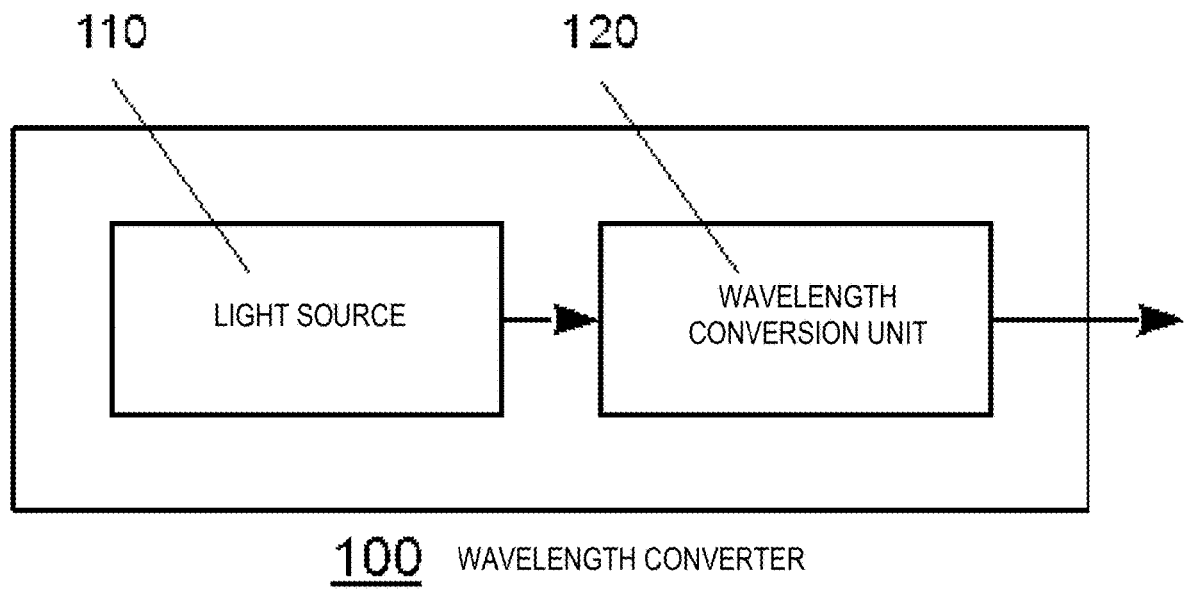
FIG. 1 is a schematic view representing a configuration of a wavelength converter of First Embodiment.

As an example, the following descriptions will be given through the case of a wavelength converter using a $ScAlMgO_4$ monocrystal as a $RAMO_4$ monocrystal. FIG. 1 is a schematic view representing a specific configuration of the wavelength converter of First Embodiment of the present disclosure.

FIG. 1 shows a wavelength converter 100 having a light source 110 and a wavelength conversion unit 120. The first layer and the second layer (neither is illustrated) are components of the wavelength conversion unit 120.

The light source 110 in the wavelength converter 100 is a member that emits first light having a first wavelength $\lambda_1$. The light source 110 is, for example, a Nd:YAG laser, and, in this case, the first wavelength $\lambda_1$ is 1,064 nm.

Figure 2:
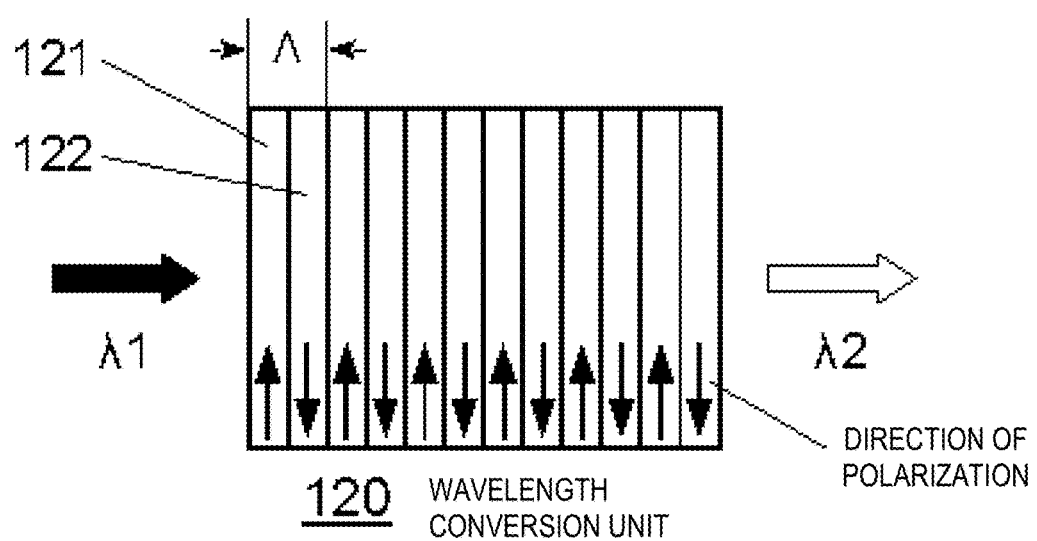
FIG. 2 is a schematic view representing a polarization reversed structure of a wavelength conversion unit of the wavelength converter of First Embodiment.

The wavelength conversion unit 120 is configured from a nonlinear optical monocrystal. The wavelength conversion unit 120 converts the first light of first wavelength $\lambda_1$ from the light source 110 into second light (second harmonic) having a second wavelength $\lambda_2$. In the present disclosure, the nonlinear optical monocrystal is a $ScAlMgO_4$ monocrystal, and the wavelength conversion unit 120, with its periodic polarization-reversed structure, generates a second harmonic by quasi-phase-matching. FIG. 2 illustrates a schematic view of the polarization reversed structure. The wavelength conversion unit 120 of the present embodiment includes a first layer 121 containing $ScAlMgO_4$ monocrystals, and a second layer 122 containing $ScAlMgO_4$ monocrystals. The first layer 121 and the second layer 122 are laminated in turn in a repeated fashion with the direction of polarization of the second layer 122 reversed 180° from that of the first layer. In the present embodiment, quasi-phase-matching is achieved by periodically reversing the dielectric polarization direction by 180°. The following formula 1 represents a relationship between polarization reversal cycle $\Lambda$ (a combined thickness of one of the first layers and one of the second layers), first wavelength $\lambda_1$, the refractive index $n_\omega$ for the first light entering the wavelength conversion unit 120, and the refractive index $n_{2\omega}$ for the second light emerging from the wavelength conversion unit 120.

$$\Lambda = \lambda_1/2(n_{2\omega} - n_\omega)$$ Formula 1

Table 1 shows the refractive indices $n_\omega$ of $LiNbO_3$, $LiTaO_3$, and $ScAlMgO_4$ for light (first light) of 1,064-nm wavelength, the refractive indices $n_{2\omega}$ of $LiNbO_3$, $LiTaO_3$, and $ScAlMgO_4$ for light (second light) of 532-nm wavelength, and the polarization reversal cycles $\Lambda$ of these materials. As shown in Table 1, the refractive index difference for light of 1,064-nm and 532-nm wavelengths is smaller in $ScAlMgO_4$ than in $LiNbO_3$ and $LiTaO_3$ traditionally used for quasi-phase-matching, and $ScAlMgO_4$ has a longer polarization reversal cycle $\Lambda$ than $LiNbO_3$ and $LiTaO_3$. This makes it possible to increase the thickness of the layers (first and second layers) constituting the wavelength conversion unit 120.

TABLE 1

|  | $LiNbO_3$ | $LiTaO_3$ | $ScAlMgO_4$ |
| --- | --- | --- | --- |
| Refractive index $n_\omega$ | 2.232 | 2.137 | 1.822 |
| Refractive index $n_{2\omega}$ | 2.304 | 2.216 | 1.844 |
| Polarization reversal cycle $\Lambda$ [μm] | 7.4 | 6.7 | 24.2 |

Figure 3:
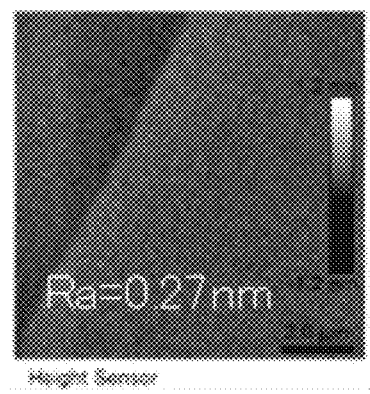
FIG. 3 is a diagram showing a surface roughness of a cleaved surface of a $ScAlMgO_4$ monocrystal used for the wavelength conversion unit of the wavelength converter of First Embodiment.

FIG. 3 shows a surface roughness of a cleaved surface of a $ScAlMgO_4$ monocrystal. The cleaved surface of $ScAlMgO_4$ monocrystal has a surface roughness Ra of 0.27 nm, without mechanical working. That is, with the $ScAlMgO_4$ monocrystal, thin slices of crystals with a small surface roughness can be obtained solely by cleaving, and the wavelength conversion unit can be fabricated by bonding these slices to one another.

Table 2 below shows the refractive index and polarization reversal cycle $\Lambda$ of $ScAlMgO_4$ for different first wavelengths $\lambda_1$. As shown in Tables 1 and 2, in contrast to the second wavelength $\lambda_2$ of 532 nm (green) for the polarization reversal cycle $\Lambda$ of 6.7 to 7.4 μm in traditional $LiNbO_3$ and $LiTaO_3$, the $ScAlMgO_4$ can produce a second wavelength $\lambda_2$ of 346 to 358 nm (UV-A) for the polarization reversal cycle $\Lambda$ of 6.7 to 7.4 That is, for a given thickness, $ScAlMgO_4$ enables conversion into shorter wavelengths than the wavelengths produced by traditional $LiNbO_3$ and $LiTaO_3$.

As can be seen from Table 2, $ScAlMgO_4$ produces a second wavelength $\lambda_2$ of 245 to 280 nm (UV-C) for a polarization reversal cycle $\Lambda$ of 3.5 to 4.4 μm, a second wavelength $\lambda_2$ of 280 to 315 nm (UV-B) for a polarization reversal cycle $\Lambda$ of 4.4 to 5.5 μm, and a second wavelength $\lambda_2$ of 315 to 400 nm (UV-A) for a polarization reversal cycle $\Lambda$ of 5.5 to 9.8 μm. The second wavelength $\lambda_2$ is 400 to 435 nm (purple) for a polarization reversal cycle $\Lambda$ of 9.8 to 12.4 μm, 435 to 480 nm (blue) for a polarization reversal cycle $\Lambda$ of 12.4 to 17.1 μm, 480 to 490 nm (green-blue) for a polarization reversal cycle $\Lambda$ of 17.1 to 18.1 μm, 490 to 500 nm (blue-green) for a polarization reversal cycle $\Lambda$ of 18.1 to 19.2 μm, and 500 to 560 nm (green) for a polarization reversal cycle $\Lambda$ of 19.2 to 26.7 μm.

TABLE 2

| $\lambda_1$ [nm] | Refractive index $n_\omega$ | $\lambda_2$ [nm] | Refractive index $n_{2\omega}$ | $\Lambda$ [μm] |
| --- | --- | --- | --- | --- |
| 1,120 | 1.821 | 560 | 1.842 | 26.7 |
| 1,000 | 1.823 | 500 | 1.849 | 19.2 |
| 980 | 1.823 | 490 | 1.850 | 18.1 |
| 960 | 1.823 | 480 | 1.851 | 17.1 |
| 870 | 1.825 | 435 | 1.860 | 12.4 |
| 800 | 1.827 | 400 | 1.868 | 9.8 |
| 718 | 1.831 | 359 | 1.879 | 7.5 |
| 716 | 1.831 | 358 | 1.880 | 7.3 |
| 692 | 1.832 | 346 | 1.883 | 6.8 |
| 690 | 1.832 | 345 | 1.884 | 6.6 |
| 630 | 1.836 | 315 | 1.893 | 5.5 |
| 560 | 1.842 | 280 | 1.906 | 4.4 |
| 490 | 1.850 | 245 | 1.921 | 3.5 |

Figure 4:
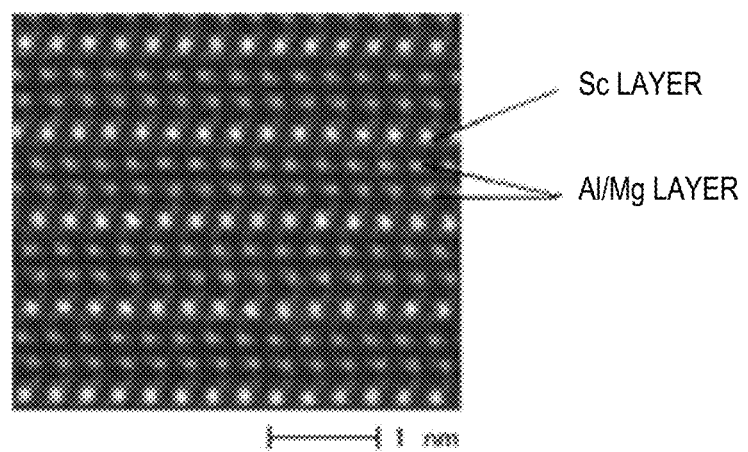
FIG. 4 shows a transmission electron microscope of a $ScAlMgO_4$ monocrystal used for the wavelength conversion unit of the wavelength converter of First Embodiment.

FIG. 4 shows a transmission electron microscope of a $ScAlMgO_4$ monocrystal. The monocrystal has a structure in which a $ScO_2$ layer, appearing like a rock-salt-type structure in plan, and an $AlMgO_2$ layer, appearing like a hexagonal crystal in plan, are alternately laminated in layers. The $ScAlMgO_4$ monocrystal cleaves at the $AlMgO_2$ layer where the binding force is weak. Consequently, the $AlMgO_2$ layers are bonded to each other for the construction of the periodic polarization-reversed structure. That is, the interface between the first layer and the second layer is an oxide of Al and Mg.

As noted above, the ScAlMgO$_4$ monocrystal has a long polarization reversal cycle Λ, and the cleaved surface has a surface roughness Ra of about 2.0 nm, which can be achieved solely by cleaving. This makes it possible to produce a second harmonic of a shorter wavelength than those produced by traditional crystals.

RAMO$_4$ single crystals applicable to the present disclosure are not limited to ScAlMgO$_4$ single crystals. The wavelength (first wavelength $\lambda_1$) of the light source 110 is not limited to 1,064 nm. The quasi-phase-matching is also capable of generating sum frequency and difference frequency. Optical parametric amplification is also possible.

Figure 5:
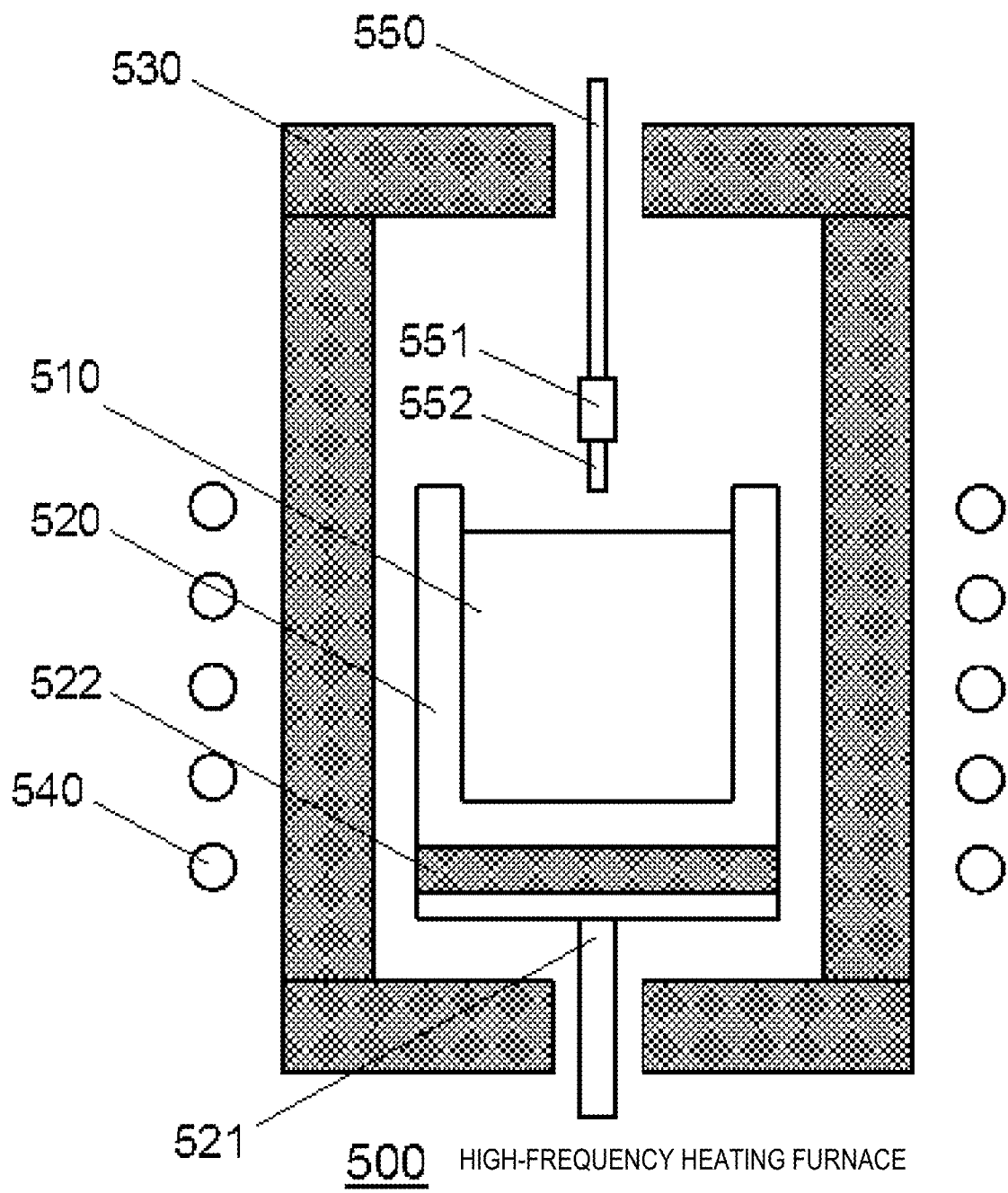
FIG. 5 is a schematic view representing a configuration of a high-frequency heating furnace used for production of a $ScAlMgO_4$ monocrystal used for the wavelength conversion unit of the wavelength converter of First Embodiment.

FIG. 5 shows a schematic view representing a configuration of a high-frequency heating furnace used for the production of a ScAlMgO$_4$ monocrystal to be used for the wavelength conversion unit of the wavelength converter of First Embodiment of the present disclosure. The following descriptions of ScAlMgO$_4$ monocrystal production are based primarily on a method by high-frequency heating. It is, however, possible to use resistance heating, instead of high-frequency heating.

FIG. 5 illustrates a high-frequency heating furnace 500 implemented as a crystal pulling device using the Czochralski (CZ) method. The high-frequency heating furnace 500 includes a ScAlMgO$_4$ feedstock 510, a crucible 520, a crucible supporting rod 521, a refractory 522, a heat insulating material 530, a heating coil 540, a crystal pulling rod 550, a seed holder 551, and a seed crystal 552. The high-frequency heating furnace 500 also includes other components required for pulling a crystal by the CZ method, for example, such as a chamber, a vacuum pump, a gas inlet, a gas outlet, a high-frequency power supply, and a controller such as a temperature controller, though not shown in FIG. 5.

The ScAlMgO$_4$ feedstock 510 is a mixture of scandium oxide (Sc$_2$O$_3$), aluminum oxide (Al$_2$O$_3$), and magnesium oxide (MgO).

The crucible 520 is an iridium vessel used to hold the ScAlMgO$_4$ feedstock 510. The crucible supporting rod 521 is a tungsten rod for supporting the crucible 520. With the crucible supporting rod 521, the crucible 520 can be rotated, and moved up and down, at set speeds. The refractory 522, made of zirconia, is a member disposed between the crucible 520 and the crucible supporting rod 521. The refractory 522 has resistance against reaction with the materials of the crucible 520 and the crucible supporting rod 521.

The heat insulating material 530 is made of zirconia, and surrounding the crucible 520. Above the crucible 520, the heat insulating material 530 has a through hole for the crystal pulling rod 550. Below the crucible 520, the heat insulating material 530 has a through hole for the crucible supporting rod 521.

The heating coil 540 is disposed on the outer side of the heat insulating material 530. Passing a high-frequency current through the heating coil 540 produces a high-frequency magnetic flux. The high-frequency magnetic flux generates eddy-current in the crucible 520. In response, the surface of the crucible 520 generates heat, and heats the ScAlMgO$_4$ feedstock 510 inside the crucible 520.

The crystal pulling rod 550 is an alumina rod, and functions to rotate, and move up and down, at set speeds. The seed holder 551, made of iridium, is disposed at the tip of the crystal pulling rod 550, and the seed crystal 552 can be set at the tip of the seed holder 551. The seed crystal 552 is ScAlMgO$_4$, and has a square prism shape.

The production of ScAlMgO$_4$ monocrystal with the high-frequency heating furnace 500 begins with a melting step that melts the ScAlMgO$_4$ feedstock 510. In the melting step, the high-frequency heating furnace 500 is vacuumed to create an inert gas atmosphere inside the furnace, and the pressure is brought to ordinary pressure with the inert gas atmosphere. After supplying power, the power applied to the heating coil 540 is gradually increased over a time period long enough to bring the temperature to a temperature that melts the ScAlMgO$_4$ feedstock 510 but short enough not to overload the crucible 520. The heating time depends on the size of the crucible 520, and is preferably 15 hours to 60 hours for a crucible 520 having an outer diameter of 80 mm to 150 mm. After checking that the ScAlMgO$_4$ feedstock 510 has melted, oxygen is introduced into the furnace. The oxygen concentration in the furnace is preferably 0.1 volume % to 10 volume %.

The next step is the seeding step. Specifically, the crystal pulling rod 550 being rotated at a certain speed is gradually moved down until the seed crystal 552 touches the molten ScAlMgO$_4$ feedstock 510. After the seed crystal 552 has touched the molten ScAlMgO$_4$ feedstock 510, the melt temperature of the molten ScAlMgO$_4$ feedstock 510 is allowed time to stabilize at a temperature suitable for pulling the crystal.

The next step is the crystal growth step, in which the crystal pulling rod 550 is moved up at a certain speed while being rotated at a certain speed. Here, the rotational speed of the crystal pulling rod 550 is preferably 1 rpm to 10 rpm, and the pulling rate of the crystal pulling rod 550 is preferably 0.1 mm/h to 1.5 mm/h. After the pulling has started, the crystal is controlled to have the desired shape by automatic diameter control (ADC). After being pulled over a distance of the desired length, the crystal is separated from the melt of ScAlMgO$_4$ feedstock 510, and the inflow of oxygen into the furnace is cut off.

This is followed by a cooling step. In this step, the crystal is cooled by gradually decreasing the applied power to the heating coil 540 over a length of time that does not place a large load on the crucible 520 and on the pulled crystal. The cooling time depends on the size of the crucible 520, and is preferably 20 hours to 70 hours for a crucible 520 having an outer diameter of 80 mm to 150 mm.

The heat insulating material 530 was described as being made of zirconia. However, the material is not limited to zirconia. The crucible 520 and the seed holder 551 were described as being made of iridium. However, these are not limited to iridium. The crucible supporting rod 521 was described as being made of tungsten. However, the material of the crucible supporting rod 521 is not particularly limited, as long as it does not react with the refractory 522. A configuration omitting the crucible supporting rod 521 is possible, provided that there is no need to rotate and move up and down the crucible 520. The refractory 522 was described as being made of zirconia. However, the material of the refractory 522 is not particularly limited, as long as it does not react with the crucible 520 and the crucible supporting rod 521. The crystal pulling rod 550 was described as being made of alumina. However, the material of the crystal pulling rod 550 is not particularly limited, as long as it does not react with the seed holder 551. The seed crystal 552 was described as having a square prism shape. However, the shape of the seed crystal 552 is not particularly limited, as long as the seed crystal 552 can be set on the seed holder 551.

The ScAlMgO$_4$ monocrystal produced in the manner described above is cleaved to a specific thickness that matches the desired polarization reversal cycle Λ. The desired numbers of multiple layers of the ScAlMgO$_4$ monocrystal obtained by cleavage are then bonded to one another with the direction of polarization reversed 180° between the adjacent layers. This produces the wavelength conversion unit 120 having the periodic polarization-reversed structure in which the first layers 121 and the second layers 122 are laminated in turn in a repeated fashion. The method for cleaving the ScAlMgO$_4$ monocrystal, and the method for bonding the layers are not particularly limited, and these may be achieved by using known methods. Preferably, the first layer and the second layer have the same thickness.

The wavelength conversion unit is combined with the desired light source 110 to obtain the wavelength converter 100. As illustrated in FIG. 2, the light source 110 and the wavelength conversion unit 120 are disposed in such a manner that the laminated surfaces of the first layers 121 and the second layers 122 (the directions of polarization of the first layer 121 and the second layer 122) of the wavelength conversion unit 120 are orthogonal to the direction in which the first light is incident from the light source 110. The polarization reversal cycle Λ may be varied by varying the direction of incident light by a small degree. For example, the polarization reversal cycle Λ increases by a fraction of)) 1.02(=1/cos(10° for a 10-degree shift of incident direction.

Second Embodiment

Second Embodiment does not differ from First Embodiment in the wavelength converter and its structure and method of production. The difference is that dielectric polarization is induced further in the ScAlMgO$_4$ monocrystal. Accordingly, the present embodiment describes a method for further inducing dielectric polarization in the ScAlMgO$_4$ monocrystal.

Figure 6:
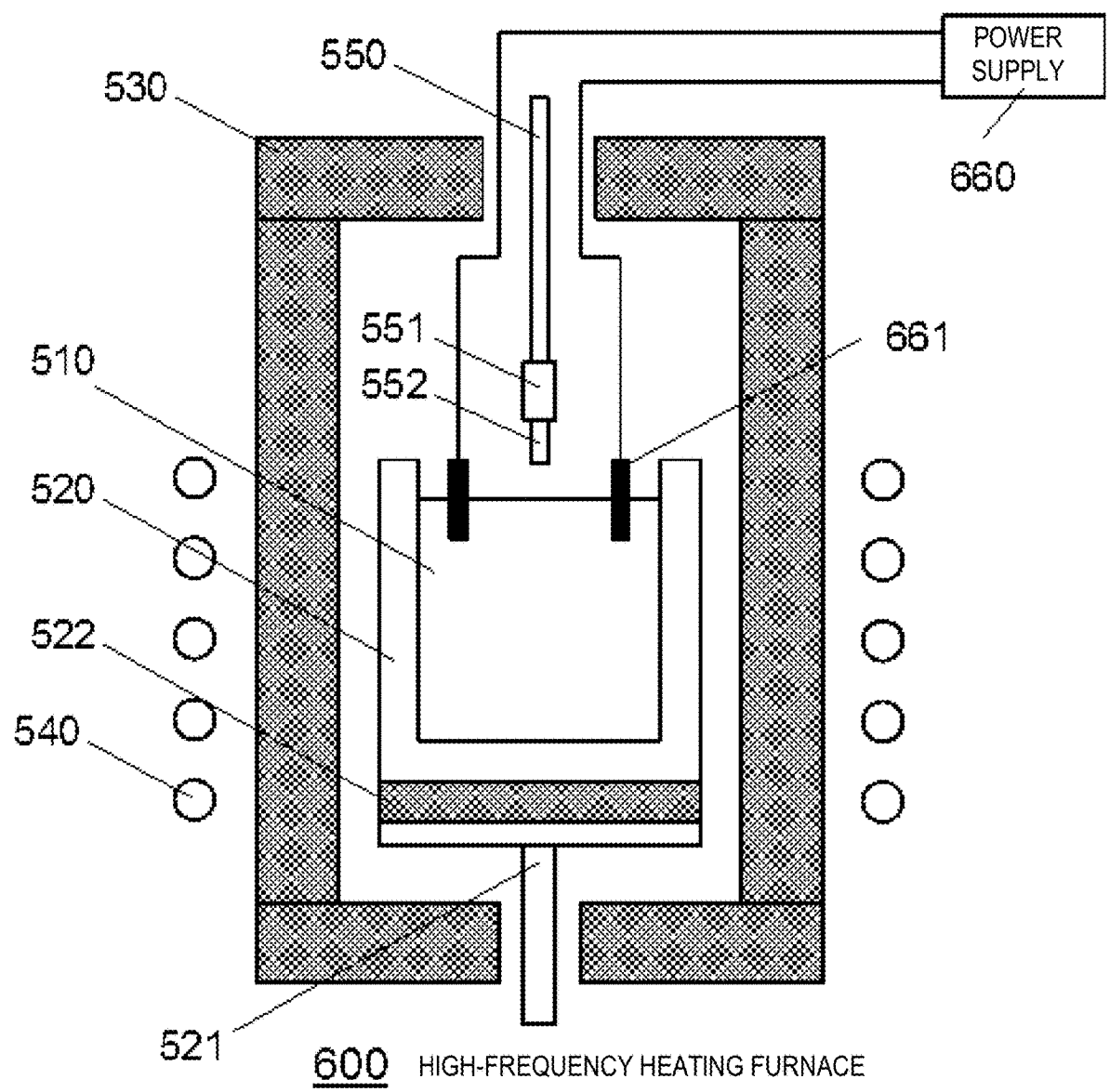
FIG. 6 is a schematic view representing a configuration of a high-frequency heating furnace used for production of a $ScAlMgO_4$ monocrystal used for a wavelength conversion unit of a wavelength converter of Second Embodiment.

FIG. 6 is a schematic view representing a configuration of a high-frequency heating furnace used for the production of a ScAlMgO$_4$ monocrystal to be used for the wavelength conversion unit in Second Embodiment. The following descriptions of ScAlMgO$_4$ monocrystal production are based on high-frequency heating. It is, however, possible to use resistance heating, instead of high-frequency heating.

The high-frequency heating furnace 600 differs from the high-frequency heating furnace 500 of FIG. 5 in that the high-frequency heating furnace 600 includes a power supply 660 and electrodes 661, as shown in FIG. 6. The high-frequency heating furnace 600 may be the same as the high-frequency heating furnace 500 of FIG. 5 except for these differences. The power supply 660 is connected to the electrodes 661, and generates an electric field across the electrodes 661. The electrodes 661 are covered with an insulator that does not react with the molten ScAlMgO$_4$ feedstock 510.

When using the high-frequency heating furnace 600, the power supply 660 is turned on to generate an electric field across the electrodes 661, before starting the crystal growth step. The power supply 660 is turned off before starting the cooling step. Further dielectric polarization of ScAlMgO$_4$ monocrystal is made possible by growing crystals in the presence of an electric field between the electrodes 661.

The ScAlMgO$_4$ monocrystal produced in the manner described above is cleaved to a specific thickness that matches the desired polarization reversal cycle Λ, and the layers are bonded to one another with the direction of polarization reversed 180° between the adjacent layers. This produces the desired wavelength conversion unit 120. The wavelength conversion unit 120 is combined with the light source to produce the wavelength converter 100 of the present embodiment.

The present disclosure provides a wavelength converter capable of producing short wavelengths by wavelength conversion. This makes it possible to widen a wavelength range such as in lasers. The present disclosure is therefore useful for a variety of devices using lasers.

What is claimed is:

1. A wavelength converter comprising:
    a first layer formed of a single crystal represented by general formula RAMO$_4$; and
    a second layer formed of a single crystal represented by the general formula RAMO$_4$ and having a direction of polarization reversed 180° from a direction of polarization of the first layer,
    wherein, in the general formula, R represents one or more trivalent elements selected from the group consisting of Sc, In, Y, and a lanthanoid element, A represents one or more trivalent elements selected from the group consisting of Fe(III), Ga, and Al, and M represents one or more divalent elements selected from the group consisting of Mg, Mn, Fe(II), Co, Cu, Zn, and Cd.

2. The wavelength converter according to claim 1, wherein the first layer and the second layer have an interface formed of an oxide containing A and M.

3. The wavelength converter according to claim 2, wherein, in the general formula, R is Sc, A is Al, M is Mg, and the interface is an oxide of Al and Mg.

4. The wavelength converter according to claim 1, comprising a wavelength conversion unit having a periodic polarization-reversed structure in which the first layer and the second layer are laminated in turn in a repeated fashion.

5. The wavelength converter according to claim 4, wherein the wavelength conversion unit generates a second harmonic.

6. The wavelength converter according to claim 5, wherein a combined thickness of one of the first layers and one of the second layers is 3.5 μm or more and 4.4 μm or less, and the second harmonic has a wavelength of 245 nm or more and 280 nm or less.

7. The wavelength converter according to claim 5, wherein a combined thickness of one of the first layers and one of the second layers is 4.4 μm or more and 5.5 μm or less, and the second harmonic has a wavelength of 280 nm or more and 315 nm or less.

8. The wavelength converter according to claim 5, wherein a combined thickness of one of the first layers and one of the second layers is 5.5 μm or more and 9.8 μm or less, and the second harmonic has a wavelength of 315 nm or more and 400 nm or less.

9. The wavelength converter according to claim 5, wherein a combined thickness of one of the first layers and one of the second layers is 9.8 μm or more and 12.4 μm or less, and the second harmonic has a wavelength of 400 nm or more and 435 nm or less.

10. The wavelength converter according to claim 5, wherein a combined thickness of one of the first layers and one of the second layers is 12.4 μm or more and 17.1 μm or less, and the second harmonic has a wavelength of 435 nm or more and 480 nm or less.

11. The wavelength converter according to claim 5, wherein a combined thickness of one of the first layers and one of the second layers is 17.1 µm or more and 18.1 µm or less, and the second harmonic has a wavelength of 480 nm or more and 490 nm or less.

12. The wavelength converter according to claim 5, wherein a combined thickness of one of the first layers and one of the second layers is 18.1 µm or more and 19.2 µm or less, and the second harmonic has a wavelength of 490 nm or more and 500 nm or less.

13. The wavelength converter according to claim 5, wherein a combined thickness of one of the first layers and one of the second layers is 19.2 µm or more and 26.7 µm or less, and the second harmonic has a wavelength of 500 nm or more and 560 nm or less.

* * * * *